US012270515B2

(12) United States Patent
Shao et al.

(10) Patent No.: US 12,270,515 B2
(45) Date of Patent: Apr. 8, 2025

(54) SYSTEMS AND METHODS FOR SAFETY MONITORING OF DURABILITY OF GAS PIPELINE CORRIDORS BASED ON MONITORING INTERNET OF THINGS SYSTEMS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Lei He, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/736,476

(22) Filed: Jun. 6, 2024

(65) Prior Publication Data

US 2024/0318790 A1 Sep. 26, 2024

(30) Foreign Application Priority Data

May 16, 2024 (CN) ........................ 202410607149.X

(51) Int. Cl.
*F17D 5/00* (2006.01)
*G08G 1/09* (2006.01)
(Continued)

(52) U.S. Cl.
CPC ............. *F17D 5/005* (2013.01); *G08G 1/091* (2013.01); *G16Y 10/35* (2020.01); *G16Y 10/40* (2020.01); *G16Y 40/10* (2020.01)

(58) Field of Classification Search
None
See application file for complete search history.

(56) References Cited

U.S. PATENT DOCUMENTS

2022/0082409 A1* 3/2022 Ukil ........................ G16Y 10/35
2023/0083626 A1* 3/2023 Shao ...................... G06N 20/00 701/2
2024/0219255 A1* 7/2024 Aseev .................... G05B 15/02

FOREIGN PATENT DOCUMENTS

CN 106100962 A 11/2016
CN 206988826 U 2/2018
(Continued)

OTHER PUBLICATIONS

First Office Action in Chinese Application No. 202410607149.X mailed on Jun. 19, 2024, 11 pages.
(Continued)

*Primary Examiner* — Lina Cordero
(74) *Attorney, Agent, or Firm* — METIS IP LLC

(57) ABSTRACT

The present disclosure provides a method for safety monitoring of durability of a gas pipeline corridor based on a monitoring Internet of Things system, comprising obtaining durability monitoring data and traffic vibration data of the pipeline corridor through a gas company sensor network platform, and obtaining road traffic data through a government safety monitoring management platform via a government safety monitoring sensor network platform; determining a traffic correlation based on at least one of the durability monitoring data, the traffic vibration data, or the road traffic data; determining a traffic-affected pipeline corridor based on at least one of the traffic vibration data or the traffic correlation, and reporting the traffic-affected pipeline corridor to a government safety monitoring service platform via the government safety monitoring sensor network platform and the government safety monitoring management platform, and determining whether to carry out traffic control via the government safety monitoring service platform.

5 Claims, 4 Drawing Sheets

200

(51) Int. Cl.

| | |
|---|---|
| ***G16Y 10/35*** | (2020.01) |
| ***G16Y 10/40*** | (2020.01) |
| ***G16Y 40/10*** | (2020.01) |

(56) References Cited

FOREIGN PATENT DOCUMENTS

| | | | |
|---|---|---|---|
| CN | 110234811 | A | 9/2019 |
| CN | 112184516 | A | 1/2021 |
| KR | 20200102201 | A | 8/2020 |

OTHER PUBLICATIONS

Shao, Zehua et al., IoT Management Platform, Internet of Things Technologies, 2021, 5 pages.

Zheng, Mingyu, Research on Intelligent Monitoring and Alarm System for Urban Underground Comprehensive Pipe Corridor Based on the Internet of Things, Full-text Database of China's Excellent Master's Thesis, Engineering Science and Technology Series II, 2023, 66 pages.

* cited by examiner

SYSTEMS AND METHODS FOR SAFETY MONITORING OF DURABILITY OF GAS PIPELINE CORRIDORS BASED ON MONITORING INTERNET OF THINGS SYSTEMS

CROSS-REFERENCE TO RELATED APPLICATIONS

The present disclosure claims priority of Chinese Patent Application No. 202410607149.X, filed on May 16, 2024, the entire contents of which are hereby incorporated herein by reference.

TECHNICAL FIELD

The present disclosure relates to the field of underground pipeline network monitoring technology, and in particular, to a system and a method for safety monitoring of durability of a gas pipeline corridor based on a monitoring Internet of Things system.

BACKGROUND

The underground pipeline corridor is an important part of urban infrastructure, used for installing and maintaining gas pipelines to ensure the safety and stability of the underground pipeline corridor, contributing to the safe operation and maintenance of the gas pipelines. The traffic conditions on the ground around the pipeline corridor, such as vehicle flow, road loading, and road vibration, can impact the durability of the pipeline corridor, leading to issues like water seepage, component detachment, metal corrosion, and structural deformation. Therefore, monitoring of the pipeline corridor is necessary, as surveillance generally occurs after an event and cannot predict future occurrences.

Therefore, there is a need to provide a system and a method for safety monitoring of durability of a gas pipeline corridor based on a monitoring Internet of Things system (IoT), so as to assess the impact on the underground pipeline corridor affected by the traffic situation on the roads around the pipeline corridor and implement timely traffic control.

SUMMARY

One or more embodiments of the present disclosure provide a method for safety monitoring of durability of a gas pipeline corridor based on a monitoring Internet of Things system. The method is executed by a gas company management platform of a system for safety monitoring of durability of a gas pipeline corridor based on a monitoring Internet of Things system (IoT), comprising: obtaining durability monitoring data and traffic vibration data of the pipeline corridor through a gas company sensor network platform, and obtaining road traffic data through a government safety monitoring management platform via a government safety monitoring sensor network platform; determining a traffic correlation based on at least one of the durability monitoring data, the traffic vibration data, or the road traffic data; and determining a traffic-affected pipeline corridor based on at least one of the traffic vibration data or the traffic correlation, and reporting the traffic-affected pipeline corridor to a government safety monitoring service platform via the government safety monitoring sensor network platform and the government safety monitoring management platform, and determining whether to carry out traffic control via the government safety monitoring service platform.

One of the embodiments of the present disclosure provides a system for safety monitoring of durability of a gas pipeline corridor based on a monitoring Internet of Things system (IoT), comprising a citizen user platform, a government safety monitoring service platform, a government safety monitoring management platform, a government safety monitoring sensor network platform, a government monitoring object platform, a gas company sensor network platform, and a gas device object platform. The government monitoring object platform includes a gas company management platform, and the gas company management platform is configured to obtain durability monitoring data and traffic vibration data of the pipeline corridor through the gas company sensor network platform, and obtain road traffic data through the government safety monitoring management platform via the government safety monitoring sensor network platform; determine a traffic correlation based on at least one of the durability monitoring data, the traffic vibration data, or the road traffic data; and determine a traffic-affected pipeline corridor based on at least one of the traffic vibration data or the traffic correlation, and reporting the traffic-affected pipeline corridor to the government safety monitoring service platform via the government safety monitoring sensor network platform and the government safety monitoring management platform, and determine whether to carry out traffic control via the government safety monitoring service platform.

One or more embodiments of the present disclosure provide a non-transitory computer-readable storage medium storing computer instructions, wherein when reading computer instructions in the storage medium, a computer executes a method for safety monitoring of durability of a gas pipeline corridor based on a monitoring Internet of Things system.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
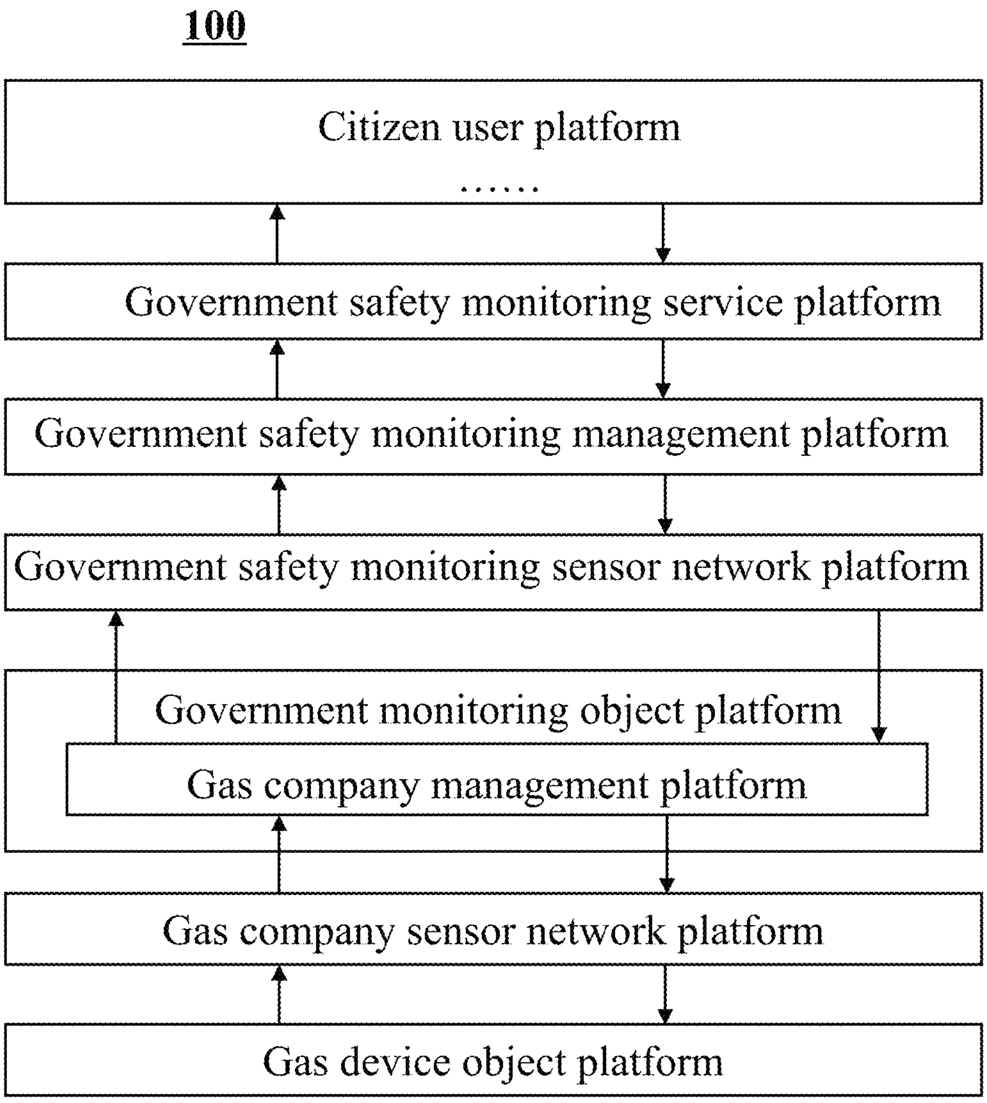
FIG. 1 is a schematic diagram illustrating an exemplary platform structure of a system for safety monitoring of durability of a gas pipeline corridor based on a monitoring Internet of Things system according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

Unless the context clearly suggests an exception, the words “an”, “a”, “one”, “one kind”, and/or “the” do not refer specifically to the singular, but may also include the plural. In general, the terms “including” and “comprising” only suggest the inclusion of explicitly identified steps and elements that do not constitute an exclusive list, and the method or apparatus may also include other steps or elements.

Flowcharts are used in the present disclosure to illustrate operations performed by a system according to embodiments of the present disclosure. It should be appreciated that the preceding or following operations are not necessarily performed in an exact sequence. Instead, steps can be processed in reverse order or simultaneously. Also, it is possible to add other operations to these processes or remove a step or steps from these processes.

FIG. 1 is a schematic diagram illustrating an exemplary platform structure of a system for safety monitoring of durability of a gas pipeline corridor based on a monitoring Internet of Things system (IoT) according to some embodiments of the present disclosure.

As shown in FIG. 1, the system for safety monitoring of durability of a gas pipeline corridor based on a monitoring Internet of Things system (hereinafter referred to as an Internet of Things system (IoT) 100) may include a citizen user platform, a government safety monitoring service platform, a government safety monitoring management platform, a government safety monitoring sensor network platform, a government monitoring object platform, a gas company sensor network platform, and a gas device object platform.

The citizen user platform refers to a platform driven by citizen users. For example, the citizen user platform may capture needs of users and provide feedback to the users.

In some embodiments, the citizen user platform may interact with the government safety monitoring service platform.

The government safety monitoring service platform is a platform configured to provide government information and services. In some embodiments, the government safety monitoring service platform may interact with the citizen user platform and the government safety monitoring management platform.

For example, the government safety monitoring service platform may send a traffic control instruction to the citizen user platform. As another example, the government safety monitoring management platform may send at least one traffic-affected pipeline corridor, etc., obtained from a gas company management platform to the government safety monitoring service platform.

The government safety monitoring management platform is a platform used for the government to comprehensively manage safety monitoring information. In some embodiments, the government safety monitoring management platform may be configured for data processing and storage of the Internet of Things system 100.

In some embodiments, the government safety monitoring management platform may also interact with the government safety monitoring sensor network platform. For example, the government safety monitoring sensor network platform may obtain road traffic data, etc., from the government safety monitoring management platform via the government safety monitoring management platform.

The government safety monitoring sensor network platform is a platform for the comprehensive management of sensing information of the government. In some embodiments, the government safety monitoring sensor network may interact with the government monitoring object platform and the government safety monitoring management platform.

The government monitoring object platform is a platform configured to generate monitoring information of the government and execute controlling information. In some embodiments, the government monitoring object platform may include the gas company management platform.

In some embodiments, the gas company management platform may be configured to obtain durability monitoring data and traffic vibration data of a pipeline corridor through the gas company sensor network platform and, and obtain road traffic data through the government safety monitoring management platform via the government safety monitoring sensor network platform. The gas company management platform may determine a traffic correlation based on at least one of the durability monitoring data, the traffic vibration data, or the road traffic data; and based on at least one of the traffic vibration data or the traffic correlation, determine the traffic-affected pipeline corridor. The gas company management platform may report the traffic-affected pipeline corridor, via the government safety monitoring sensor network platform and the government safety monitoring management platform, to the government safety monitoring service platform, and may determine whether to carry out traffic control via the government safety monitoring service platform.

In some embodiments, the gas company management platform may also be further configured to determine a durability change feature of the pipeline corridor based on the durability monitoring data, and to determine the traffic correlation based on at least one of the durability change feature, the traffic vibration data, or the road traffic data.

In some embodiments, the gas company management platform may also be configured to construct a pipeline corridor structure map based on the durability monitoring data; and based on the pipeline corridor structure map, determine the durability change feature using a feature recognition model.

In some embodiments, the gas company management platform may be further configured to determine the traffic correlation and a road relevance type based on at least one of the durability change feature, the traffic vibration data, or the road traffic data using a relevance determination model.

In some embodiments, the gas company management platform may be further configured to determine a key monitoring pipeline corridor based on the traffic vibration data; and determine the traffic-affected pipeline corridor based on the key monitoring pipeline corridor and the traffic correlation.

In some embodiments, the gas company management platform may be further configured to determine the traffic-affected pipeline corridor based on the key monitoring pipeline corridor, the traffic correlation, and the road relevance type.

The gas company sensor network platform refers to a platform for the comprehensive management of sensing information of a gas company. In some embodiments, the gas company sensor network platform may be configured as a communication network or a gateway, etc.

The gas device object platform is a functional platform configured to generate sensing information and execute controlling information. In some embodiments, the gas device object platform may include a pipeline corridor monitoring device and a ground monitoring device.

The pipeline corridor monitoring device is a device configured to monitor information about the pipeline corridor. The pipeline corridor monitoring device may include at least one of a sensor, an image acquisition device, a mechanical testing device, or the like. The mechanical testing device may include an ultrasonic flaw detector, etc. In some embodiments, the pipeline corridor monitoring device may be configured to monitor the pipeline corridor and upload the durability monitoring data of the pipeline corridor to the gas company sensor network platform. The ground monitoring device is a device configured to monitor ground information. The ground monitoring device may include at least one of a vibration monitoring device, or the like. The vibration monitoring device may include a sensor. The sensor may include a pressure sensor, a vibration sensor, or the like. In some embodiments, the ground monitoring device may be configured to monitor a ground corresponding to the pipeline corridor and upload the traffic vibration data to the gas company sensor network platform.

In some embodiments, the Internet of Things system 100 may further include a processor. In some embodiments, the processor may process information and/or data related to the Internet of Things system 100 to perform one or more of the functions described in the present disclosure.

In some embodiments, the processor may be configured to obtain the traffic-affected pipeline corridor from the gas company management platform and send the traffic-affected pipeline corridor to the government safety monitoring service platform. In response to obtaining control feedback information from the government safety monitoring service platform, the processor may determine a traffic control instruction based on the control feedback information and upload the traffic control instruction to the citizen user platform.

In some embodiments, the processor may include one or more processing engines (e.g., a single-chip processing engine or a multi-chip processing engine). By way of example only, the processor may include a central processing unit (CPU), an application-specific integrated circuit (ASIC), an application-specific instruction processor (ASIP), a graphics processor (GPU), a physical processor (PPU), a digital signal processor (DSP), a field-programmable gate array (FPGA), a programmable logic circuit (PLD), a controller, a microcontroller unit, a Reduced Instruction Set Computer (RISC), a microprocessor, or any combination of the above. In some embodiments, the processor may interact with a plurality of platforms included in the Internet of Things system 100 (e.g., the citizen user platform, the government safety monitoring service platform, the government monitoring object platform, etc.).

The control feedback information is feedback information on whether to carry out the traffic control. In some embodiments, the control feedback information may be generated by the government safety monitoring service platform after evaluating the traffic-affected pipeline corridor.

The traffic control instruction is an instruction to carry out the traffic control in an area. In some embodiments, the traffic control instruction may be determined based on the control feedback information and a relevant road needed to be controlled may be uploaded to the citizen user platform via the processor. Based on the traffic control instruction from the citizen user platform, a user may try to avoid traveling through the relevant road needed to be controlled.

The pipeline corridor monitoring device and the ground monitoring device may monitor the pipeline corridor and a ground situation in real-time, obtain relevant data of the pipeline corridor and the ground, and use the data for the accurate assessment of the condition of the pipeline corridor and the ground, which is convenient for relevant technicians to carry out further processing of the pipeline corridor and the traffic conditions. Additionally, the processor sends the traffic control instruction to the citizen user platform based on the control feedback information, which allows timely adjustment of a road traffic situation and prevents damage to an underground pipeline corridor due to undesirable traffic conditions, which affects the use of the underground pipeline corridor, thereby protecting the safety and smooth operation of the gas pipeline corridor.

In some embodiments, the Internet of Things system 100 may also include a multi-level network, such as a tier-one network and a tier-two network. For example, the tier-one network may include a smart gas tier-one network user platform, a smart gas tier-one network service platform, a smart gas tier-one network management platform, a smart gas tier-one network sensor network platform, and a smart gas tier-one network object platform. As another example, the tier-two network may include a smart gas tier-two network user platform, a smart gas tier-two network service platform, a smart gas tier-two network management platform, a smart gas tier-two network sensor network platform, and a smart gas tier-two network object platform. Various platforms in the Internet of Things system 100 may correspond to different functions at different levels of the network. For example, the government monitoring object platform may realize functions as an object platform when the government monitoring object platform is in the tier-one network, and the gas company management platform included in the government monitoring object platform may realize a management function when gas company management platform is in the tier-two network, or the like.

Based on the Internet of Things system 100, a closed loop of information operation between the various functional platforms and coordinated and regular operation thereof can be realized, enabling the informatization and intelligence of the monitoring of durability for a smart gas underground pipeline corridor.

Figure 2:
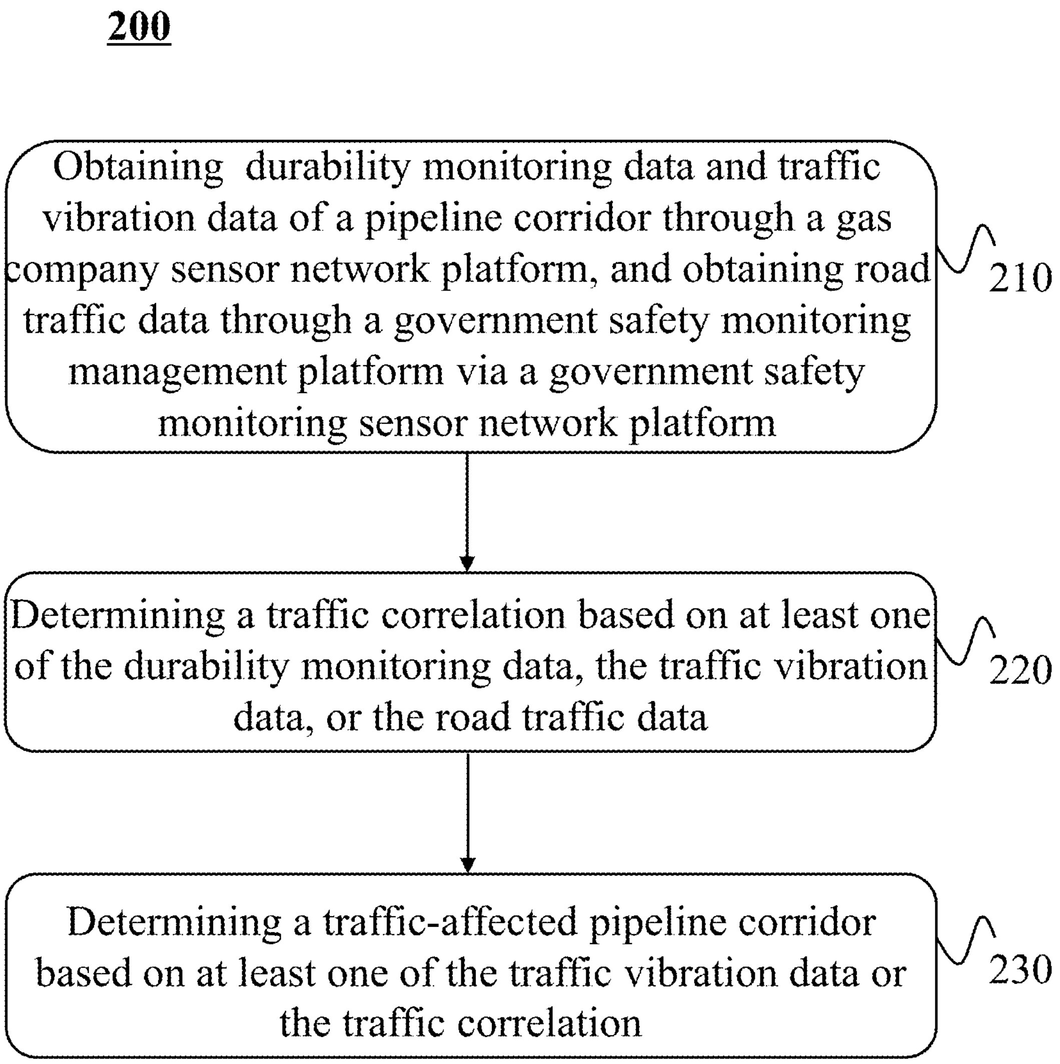
FIG. 2 is a flowchart illustrating a method for safety monitoring of durability of a gas pipeline corridor based on a monitoring Internet of Things system according to some embodiments of the present disclosure.
Figure 3:
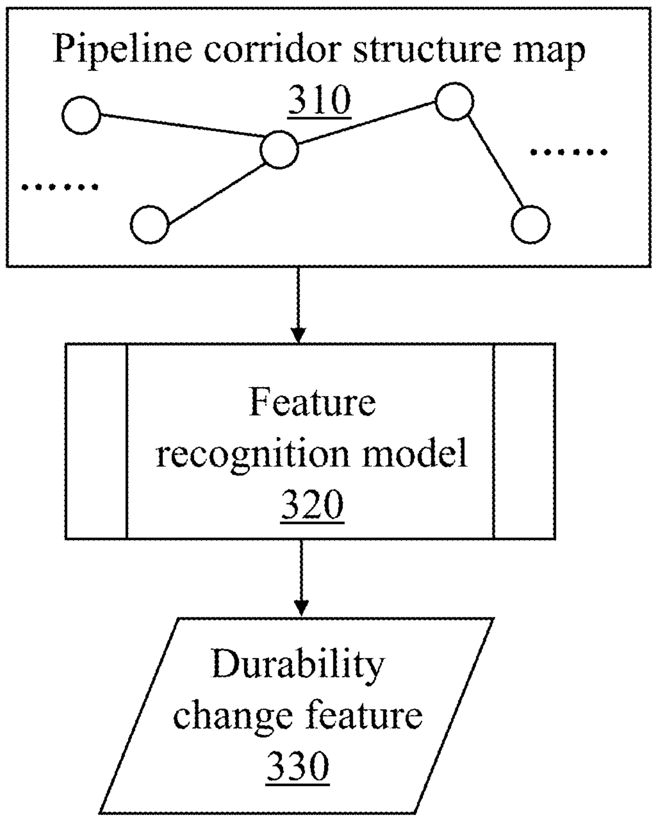
FIG. 3 is a schematic diagram illustrating determining a durability change feature of a pipeline corridor according to some embodiments of the present disclosure.
Figure 4:
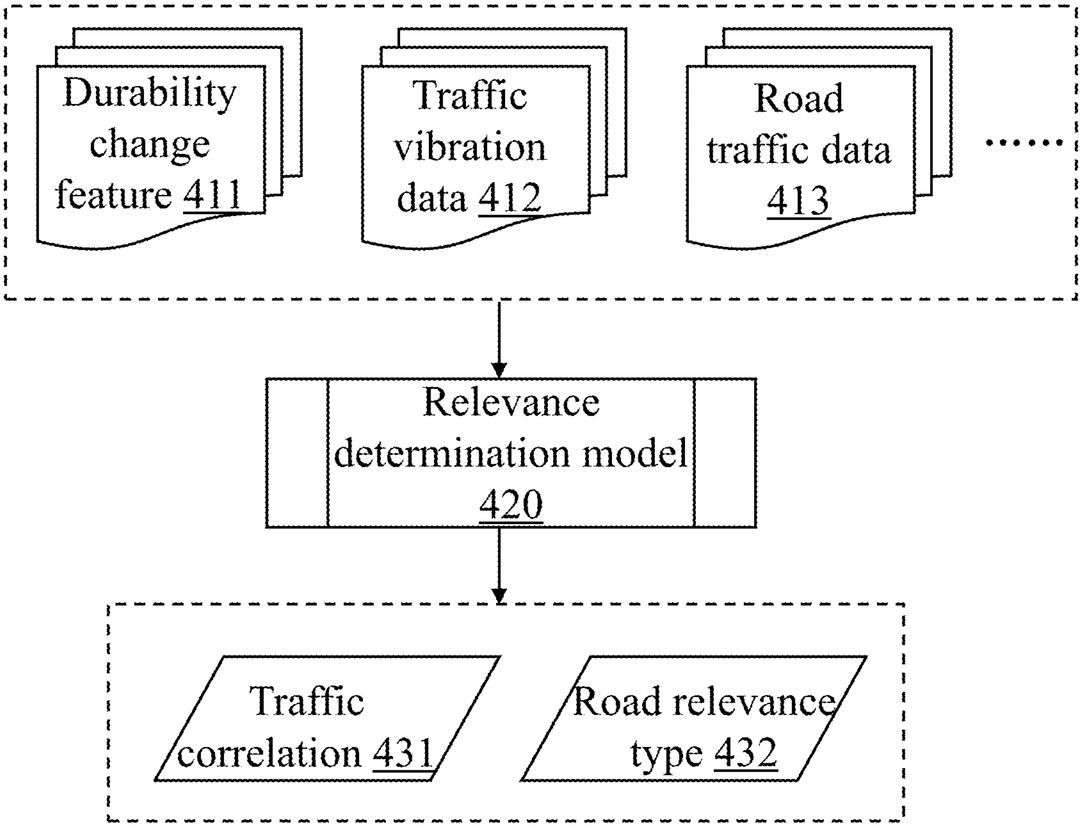
FIG. 4 is a schematic diagram illustrating an exemplary relevance determination model according to some embodiments of the present disclosure.

A detailed description of the foregoing can be found in the descriptions of FIG. 2 to FIG. 4.

FIG. 2 is a flowchart illustrating a method for safety monitoring of durability of a gas pipeline corridor based on a monitoring Internet of Things system according to some embodiments of the present disclosure. As shown in FIG. 2, a process 200 includes following steps. In some embodiments, the process 200 may be performed by a gas company management platform based on a system for safety monitoring of durability of a gas pipeline corridor based on a monitoring Internet of Things system. The process 200 may include following steps.

Step 210, obtaining durability monitoring data and traffic vibration data of the pipeline corridor through a gas company sensor network platform, and obtaining road traffic data through a government safety monitoring management platform via a government safety monitoring sensor network platform.

The pipeline corridor is an underground passageway made up of various pipelines. The pipeline corridor may be used to install and maintain various urban infrastructure and service lines, such as gas pipelines, water pipelines, cables, communication lines, or the like. A gas underground pipeline corridor refers to an underground passage dedicated to the installation and maintenance of gas pipelines.

The durability monitoring data is monitoring data reflecting durability of the pipeline corridor. For example, the durability monitoring data may include data related to various aspects, such as water seepage, component shedding, and structural deformation of the pipeline corridor. In some embodiments, the durability monitoring data may be represented by monitoring sequence data at a plurality of moments within a predetermined time period. A length of the predetermined time period may be manually set as desired. For example, the durability monitoring data may be expressed as [water seepage rate $a_1$+vibration feature $b_1$+deformation feature $c_1$ at a moment $t_1$, water seepage rate $a_2$+vibration feature $b_2$+deformation feature $c_2$ at a moment $t_2$, water seepage rate $a_3$+vibration feature $b_3$+deformation feature $c_3$ at a moment $t_3$, . . . ], where $t_1$, $t_2$, $t_3$, etc., are moments selected according to a gradient within the predetermined time period, and the gradient may be manually set according to the demand.

The traffic vibration data is data reflecting a vibration feature of a road around the pipeline corridor. For example, the traffic vibration data may include data such as a vibration frequency, a vibration duration, a vibration interval, etc., of the road around the pipeline corridor. In some embodiments, the gas company management platform may obtain traffic vibration data at a plurality of moments within the predetermined time period using a vibration monitoring device via the gas company sensor network platform.

In some embodiments, the gas company management platform may obtain durability monitoring data and traffic vibration data of the pipeline corridor within one or more predetermined time periods through the gas company sensor network platform. The predetermined time period is a preset time period. The length of the predetermined time period may be manually set as required. The gas company management platform may obtain the durability monitoring data through the pipeline corridor monitoring device via the gas company sensor network platform. The gas company management platform may obtain the traffic vibration data using a ground monitoring device via the gas company sensor network platform. More information about the pipeline corridor monitoring device and the ground monitoring device can be found in FIG. 1 and the related descriptions.

The road traffic data is data that reflects a road traffic condition. For example, the road traffic data may include data such as a type of passing vehicles, a count of vehicles passing in a unit of time, or the like.

In some embodiments, the gas company management platform may obtain the road traffic data through the government safety monitoring sensor network platform. The government safety monitoring sensor network platform may interact with a transportation platform through the government safety monitoring management platform to obtain the road traffic data within the predetermined time period.

Step 220, determining a traffic correlation based on at least one of the durability monitoring data, the traffic vibration data, or the road traffic data.

The traffic correlation reflects a correlation degree between a pipeline corridor anomaly and the road traffic in a preset area. The traffic correlation may be expressed in terms of rank or number. For example, the traffic correlation may be expressed as 0 or 1, with 0 indicating that the pipeline corridor anomaly is weakly correlated with road traffic. 1 indicates that the pipeline corridor anomaly is strongly correlated with road traffic. The preset area is a predetermined geographic area. Gas supply and road traffic vary from one geographic area to another, so different areas are divided according to different needs.

The gas company management platform may determine the traffic correlation within the predetermined time period by a plurality of manners based on at least one of the durability monitoring data, the traffic vibration data, or the road traffic data. For example, for a preset area A, the gas company management platform may construct a first feature vector based on at least one of durability monitoring data, traffic vibration data, or road traffic data of the preset area A within the predetermined time period. The gas company management platform may search for a first reference vector with a smallest vector distance in a first vector database based on the first feature vector and use a historical traffic correlation corresponding to the first reference vector as the traffic correlation within the predetermined time period. The first vector database includes a plurality of first reference vectors and historical traffic correlations corresponding to the first reference vectors. The first reference vector may be constructed based on at least one of historical durability monitoring data, historical traffic vibration data, or historical road traffic data during a historical monitoring process. The gas company management platform may obtain traffic correlation of one or more different preset areas at different time points within the predetermined time period in the above manner.

In some embodiments, the gas company management platform may determine a durability change feature of the pipeline corridor based on the durability monitoring data; and determine the traffic correlation based on at least one of the durability change feature, the traffic vibration data, or the road traffic data.

The durability change feature is feature data reflecting a change in durability of the pipeline corridor. In some embodiments, the durability change feature may include a durability change type, a durability change intensity, a durability change start moment, a durability change end moment, or the like. The durability change type may include sudden drop, continuous drop, or the like. The sudden drop in durability may include sudden water seepage inside the pipeline corridor, sudden pipeline breakage, or the like. The continuous drop in durability may include a gradual increase in the degree of corrosion inside the pipeline corridor, a gradual increase in structural deformation, or the like. The durability change intensity refers to a change rate of decline in durability of the pipeline corridor.

In some embodiments, the gas company management platform may determine, based on the durability monitoring data, the durability change feature within the predetermined time period by various manners. For example, for a certain preset area, the gas company management platform may obtain a plurality of change rates by calculating durability monitoring data of the pipeline corridor at a plurality of moments within the predetermined time period. If the change rate exceeds a predetermined change rate threshold, the gas company management platform may then determine that the durability change type is the sudden drop. The gas company management platform may designate a moment when a change rate of the durability monitoring data exceeds the predetermined change rate threshold as a durability change start moment. The gas company management platform may designate a moment after which the change rate of the durability monitoring data is lower than the predetermined change rate threshold as a durability change end moment. An average value of change rates of the durability from the durability change start moment to the durability change end moment is taken as the durability change intensity. The predetermined change rate threshold may be manually preset based on experience. In some embodiments, durability change features corresponding to different pieces of durability monitoring data (e.g., water seepage, component shedding, structural deformation of the pipeline corridor, etc.) may be determined based on the above manner, respectively.

In some embodiments, the gas company management platform may also construct a pipeline corridor structure map based on the durability monitoring data; and based on the pipeline corridor structure map, determine the durability change feature using a feature recognition model. For more details, please refer to FIG. 3 and related descriptions thereof.

In some embodiments, the gas company management platform may determine a traffic correlation of a certain preset area by a plurality of manners, based on at least one of the durability change features, the traffic vibration data, or the road traffic data. For example, the gas company management platform may construct a second feature vector based on the durability change feature, the traffic vibration data, or the road traffic data, and calculate a cosine distance between the second feature vector and a second reference vector. The gas company management platform may determine a traffic correlation value based on the cosine distance and determine the traffic correlation as 1 when the traffic correlation value is greater than a predetermined correlation threshold value, and determine the traffic correlation as 0 when the traffic correlation value is less than the predetermined correlation threshold value. The predetermined correlation threshold value may be manually set based on experience. The traffic correlation value may be positively correlated with the cosine distance. The gas company management platform may determine the traffic correlation value based on a following formula:

$$\text{traffic correlation value}=k_1*\cos([\text{durability change feature, traffic vibration data, road traffic data}],[\text{standard durability change feature, standard traffic vibration data, standard road traffic data}])$$

where, $k_1$ denotes a correction coefficient, and a value of $k_1$ may range from 0 to 1. The second reference vector is constructed based on the standard durability change feature, the standard traffic vibration data, and the standard road traffic data. The standard durability change feature, the standard traffic vibration data, and the standard road traffic data characterize data when the pipeline corridor anomaly is associated with the road traffic. k1, the standard durability change feature, the standard traffic vibration data, and the standard road traffic data may be empirically preset.

In some embodiments, the gas company management platform may also determine the traffic correlation and a road relevance type based on at least one of the durability change feature, the traffic vibration data, or the road traffic data using a relevance determination model. Further details can be found in FIG. 4 and related descriptions.

Some embodiments of the present disclosure determine the durability change feature based on the durability monitoring data, and determine the traffic correlation based on at least one of the durability change features, the traffic vibration data, or the road traffic data. The method takes into account different durability change types, durability change intensities, or the like, so as to obtain a reliable traffic correlation, which enables a more accurate and timely determination of a traffic-affected pipeline corridor.

Step 230, determining the traffic-affected pipeline corridor based on at least one of the traffic vibration data or the traffic correlation.

The traffic-affected pipeline corridor refers to a gas underground pipeline corridor affected by the road traffic. Although the pipeline corridor is designed and constructed to withstand the effects of a maximum load of surrounding road, subsequent assessment of effects on the pipeline corridor due to persistent disturbances such as traffic loads is still required.

In some embodiments, the gas company management platform may determine one or more traffic-affected pipeline corridors based on at least one of traffic vibration data or the traffic correlation by multiple manners. In some embodiments, the gas company management platform may determine whether at least one of the traffic vibration data or the traffic correlation satisfies a predetermined determination condition, and then determine the traffic-affected pipeline corridor. The predetermined determination condition may be at least one of the traffic correlation being 1 and the traffic vibration data is greater than a first threshold, or the traffic correlation being 0 and the traffic vibration data is greater than a second threshold. The second threshold is greater than the first threshold. For example, for a preset area, the gas company management platform may determine one or more pipeline corridors whose traffic correlations are 1 and traffic vibration data is greater than the first threshold as the traffic-affected pipeline corridors. As another example, the gas company management platform may determine one or more pipeline corridors whose traffic correlations are 0 and traffic vibration data is greater than the second threshold as the traffic-affected pipeline corridors. The gas company management platform may determine a plurality of pipeline corridors in a plurality of preset areas that satisfy the predetermined determination condition as the traffic-affected pipeline corridor in the same manner.

In some embodiments, the gas company management platform may determine a key monitoring pipeline corridor based on the traffic vibration data; and determine the traffic-affected pipeline corridor based on the key monitoring pipeline corridor and the traffic correlation.

The key monitoring pipeline corridor is a corridor that may be affected by traffic on the road.

In some embodiments, the gas company management platform may determine a plurality of key monitoring pipeline corridors based on a variety of ways. For example, the gas company management platform may determine one or more underground pipeline corridors that are affected by moving vehicles on the road or next to the road as one or more key monitoring pipeline corridors. As another example, the gas company management platform may determine one or more underground pipeline corridors whose traffic vibration data satisfies the predetermined vibration condition within the preset area as one or more key monitoring pipeline corridors. The predetermined vibration condition is a condition for determining the key monitoring pipeline corridor. For example, the predetermined vibration condition is that the traffic vibration data is greater than a traffic vibration threshold. The traffic vibration threshold may be obtained by human setting.

In some embodiments, the gas company management platform may determine the one or more traffic-affected pipeline corridors based on one or more key monitoring pipeline corridors and traffic correlations corresponding to the one or more key monitoring pipeline corridors. For example, the gas company management platform may determine one or more key monitoring pipeline corridors whose corresponding traffic correlations are 1 as the one or more traffic-affected pipeline corridors.

Based on the traffic vibration data, the key monitoring pipeline corridor is determined; based on the key monitoring pipeline corridor and the traffic correlation, the traffic-affected pipeline corridor is determined, which can enable a quick and accurate locating of the traffic-affected pipeline corridor, allowing targeted reporting of the traffic-affected pipeline corridor. Subsequently, roads in an area where the traffic-affected pipeline corridor is located can be further controlled.

In some embodiments, the traffic-affected pipeline corridor is related to the road relevance type, and the gas company management platform may determine the traffic-affected pipeline corridor based on the key monitoring pipeline corridors, the traffic correlation, and the road relevance type.

The road relevance type refers to a type in which the pipeline corridor anomaly is relevant to the road traffic. In some embodiments, the road relevance type may include at least one of a direct relevance, an indirect relevance, or an irrelevance. The direct relevance means that the pipeline corridor anomaly is directly relevant to a road traffic situation. The indirect relevance means that the pipeline corridor anomaly is indirectly relevant to the road traffic situation due to a third party. The irrelevance means that the pipeline corridor anomaly is not relevant to the road traffic situation.

In some embodiments, the road relevance type may be determined using a relevance determination model. Further description of the relevance determination model can be found in the related description of FIG. 4.

In some embodiments, the gas company management platform may determine the one or more traffic-affected pipeline corridors based on a variety of ways. For example, the gas company management platform may determine one or more key monitoring pipeline corridors that are heavily impacted by traveling vehicles on the road or next to the road as the one or more traffic-affected pipeline corridors. As another example, the gas company management platform may determine one or more key monitoring pipeline corridors whose traffic correlations and the road relevance type satisfy a predetermined correspondence within a certain preset area as the one or more traffic-affected pipeline corridors. The predetermined correspondence is a condition for determining the traffic-affected pipeline corridors. The gas company management platform may preset the predetermined correspondence in advance according to the actual situation. For example, the predetermined correspondence is that a key monitoring pipeline corridor whose traffic correlation is 1 and the road relevance type is the direct relevance is the traffic-affected pipeline corridor. As another example, the predetermined correspondence is a key monitoring pipeline corridor whose traffic correlation is 0 or 1 and the road relevance type is the indirect relevance is the traffic-affected pipeline corridor.

Determination of the traffic-affected pipeline corridor based on the key monitoring pipeline corridor, the traffic correlation, and the road relevance type takes into account the compounding effect of the road relevance type and the traffic correlation on determining the traffic-affected pipeline corridor, thereby reducing the possibility of misjudgment while determining the traffic-affected pipeline corridor.

In some embodiments, the gas company management platform may report the traffic-affected pipeline corridor to the government safety monitoring service platform via the government safety monitoring sensor network platform and the government safety monitoring management platform and determine whether to carry out traffic control via the government safety monitoring service platform.

The traffic control refers to a control of an area and/or a road. The traffic control includes various manners, such as a road closure, a traffic restriction, or the like. Related roads are ground roads in a certain area corresponding to the traffic-affected pipeline corridor. In some embodiments, the gas company management platform may arrange maintenance and upkeep of the traffic-affected pipeline corridor according to actual needs.

Further descriptions of the government safety monitoring sensor network platform, the government safety monitoring management platform, and the government safety monitoring service platform can be found in the related descriptions of FIG. 1.

Some embodiments of the present disclosure determine the traffic correlation based on at least one of durability monitoring data, traffic vibration data, or road traffic data, and determine the traffic-affected pipeline corridor based on at least one of the traffic vibration data or the traffic correlation. The above method is capable of predicting possible impacts on the underground pipeline corridor based on changes in the durability of the pipeline corridor, changes in ground traffic loads, and vibrations, etc. This allows for a reasonable judgment of the pipeline corridor that is impacted by the traffic and timely reporting to the government safety monitoring service platform to determine whether to carry out the traffic control.

FIG. 3 is a schematic diagram determining a durability change feature of a pipeline corridor according to some embodiments of the present disclosure.

In some embodiments, as shown in FIG. 3, a gas company management platform may construct a pipeline corridor structure map 310; based on the pipeline corridor structure map 310, determine a durability change feature 330 using a feature recognition model 320.

The pipeline corridor structure map 310 is a map that describes a pipeline structure and relationship of a pipeline corridor. The pipeline corridor structure map may include nodes and edges. Features or attributes of the nodes and edges may be represented by a node feature and an edge feature, respectively.

The node denotes a specific location within the pipeline corridor. For example, the node may be a location of a point, area, device, etc., within the pipeline corridor. The node may be represented by a letter or number, etc.

The node feature is information or a parameter that indicates a feature of the node. For example, the node feature may include a node type, durability monitoring data corresponding to the node, or the like. The node type refers to a physical object to which the node corresponds, e.g., a device, wall, floor tile, etc.

Each node corresponds to a different physical object, and durability monitoring data monitoring the node may be different. For example, if a node type of a certain node is a wall, then a durability monitoring data sequence of the node may include water seepage, siding shedding, structural deformation, and similar issues of the wall at different moments within a predetermined period. More details on the durability monitoring data can be found in FIG. 2 and the related descriptions.

In some embodiments, the gas company management platform may determine the node and the node feature in multiple ways. For example, the gas device object platform may capture image data and the durability monitoring data of an underground pipeline corridor using a pipeline corridor monitoring device and upload the image data and the durability monitoring data to a gas company sensor network platform. The gas company management platform may, based on the gas company sensor network platform, obtain the image data and the durability monitoring data of the underground pipeline corridor, and determine the node and the node feature based on the image data and the durability monitoring data of the underground pipeline corridor.

In some embodiments, the node feature of the node of the pipeline corridor structure map includes whether or not an area in which the node is located is a key monitoring pipeline corridor.

The area where the node is located refers to an area of a pipeline corridor to which the node belongs.

The gas company management platform may mark a node feature of a node contained in a pipeline corridor that is determined as the key monitoring pipeline corridor as the key monitoring pipeline corridor. For more information about the key monitoring pipeline corridor, refer to FIG. 2 and the related descriptions.

If an area where the node is located is determined as the key monitoring pipeline corridor, it means that the node is also affected by road traffic and is different from a node in an area of a non-key monitoring pipeline corridor. Therefore, taking whether an area where the node is located is the key monitoring pipeline corridor into account as the node feature can make a constructed pipeline corridor structure map more accurate, thus making the subsequent prediction of the durability change feature more accurate.

The edge is used to connect two nodes. In some embodiments, two nodes that have a connectivity relationship may be connected into an edge. The connectivity relationship may include mechanical coupling, uncoupled contact, a parallel structure, etc. Different connectivity relationships may correspond to different types of edges, respectively. Edges corresponding to the connectivity relationships are a first class of edge, a second class of edge, a third class of edge, etc. The edge feature is information or parameters that characterize a property of an edge. Different types of edges may be represented by different edge features.

The first class of edge is an edge that connects two nodes that are mechanically coupled. For example, if a node A and a node B represent two gas pipelines, and the node A and the node B are tightly connected by a mechanical structure (e.g., screw riveting, etc.), then the node A and the node B are connected by the first class of edge. An edge feature of the first class of edge may include a connection feature, for example, a connection feature of the node A and the node B is screw riveting. The connection feature may characterize a manner in which nodes are connected, such as screw riveting.

The second class of edge is an edge that connects two nodes where there is uncoupled contact (e.g., physical contact). For example, if the node A represents a gas pipeline, a node C represents a wall, and there is physical contact between the node A and the node C, then the node A and the node C are connected by the second class of edge. An edge feature of the second class of edge may include a contact acreage of nodes.

The third class of edge is an edge that connects two nodes of a parallel structure (e.g., belonging to the same structure). For example, if a node D and a node E are two different point locations on the same gas pipeline, the node D and the node E are connected by the third class of edge. An edge feature of the third class of edge may include a distance between nodes (two different point locations).

In some embodiments, the gas company management platform may determine the edge and the edge feature in multiple ways. For example, a gas device object may capture image data of an underground pipeline corridor through a pipeline corridor monitoring device (e.g., an image acquisition device) and upload the image data to the gas company sensor network platform. The gas company management platform may obtain the image data of the underground pipeline corridor based on the gas company sensor network platform, and determine the edge and the edge feature based on the image data of the underground pipeline corridor.

In some embodiments, the gas company management platform may construct the pipeline corridor structure map 310 based on the node, the node feature, the edge, and the edge feature obtained above.

The feature recognition model is a model for recognizing the durability change feature of the pipeline corridor. The feature recognition model may be a machine learning model. For example, the feature recognition model may be a Graph Neural Networks (GNN) model, etc. More information on the durability change feature can be found in FIG. 2 and related descriptions.

In some embodiments, an input of the feature recognition model includes the pipeline corridor structure map; and an output includes durability change features corresponding to nodes in the pipeline corridor structure map.

In some embodiments, the feature recognition model may be obtained by training based on a large number of first training samples and first labels corresponding to the first training samples. Each set of training samples in the first training sample may include a sample pipeline corridor structure map. The first training samples may be obtained based on historical data and/or simulated data.

The first label corresponding to each set of the first training samples may be a sample durability change feature of a sample node corresponding to each set of first training samples. The sample durability change feature of each set may include a sample durability change type, a sample durability change intensity, a sample durability change start moment, and a sample durability change end moment. The first label may be obtained in a variety of ways. For example, the gas company management platform may label a moment when a sudden change in durability of the sample pipeline corridor occurs in the historical data and/or the simulated data as the "sample durability change start moment". According to a change in the durability of the sample pipeline corridor after the above moment, the sample durability change type, the sample durability change intensity, and the sample durability change end moment are determined and labeled in the first label. The gas company management platform may determine that the durability of the sample pipeline corridor has undergone a sudden change based on a change rate of sample durability exceeding a predetermined change threshold. The predetermined change threshold may be set manually based on experience.

In some embodiments, the gas company management platform may input a plurality of first training samples with the first labels into an initial feature recognition model, construct a loss function through the first labels and a result of the initial feature recognition model, and iteratively update parameters of the initial feature recognition model through gradient descent or other approaches based on the loss function. The training of the feature recognition model is completed when a predetermined condition is satisfied, and a trained feature recognition model is obtained. The predetermined condition may be that the loss function converges, a count of iterations reaches a threshold, and so on.

In some embodiments, historical data and/or simulated data for determining the first label may be obtained by a mechanical testing device (e.g., an ultrasonic flaw detector, etc.). Due to the high cost of using the ultrasonic flaw detector continuously over a period for evaluating the durability change feature, it is only used for the annotation of the first label during a training process of the feature recognition model. Once the feature recognition model has been trained, the durability change feature may be evaluated in real-time using lower cost manners (e.g., the image acquisition device, etc.). Obtaining the first label data by the ultrasonic flaw detector can make the trained feature recognition model more accurate, thereby improving the accuracy of the feature recognition model in recognizing the durability change feature.

In some embodiments, the first label may also be determined by other manners, e.g., manual labeling or automated labeling, etc.

Some embodiments of the present disclosure, based on the pipeline corridor structure map, determine the durability change feature using the feature recognition model, which can improve the accuracy of a determined durability change feature and is conducive to the subsequent improvement in the accuracy of a determined traffic correlation, thereby improving the accuracy of a determined traffic-affected pipeline corridor. Using only the pipeline corridor structure map during the use of the feature recognition model, the accuracy of ultrasonic detection can be achieved, thereby reducing costs.

FIG. 4 is a schematic diagram illustrating an exemplary relevance determination model according to some embodiments of the present disclosure.

In some embodiments, a gas company management platform may determine a traffic correlation and a road relevance type using the relevance determination model based on at least one of durability change feature, traffic vibration data, or road traffic data. More information on the durability change feature, the traffic vibration data, the road traffic data, the traffic correlation, and the road relevance type can be found in the relevant description of FIG. 2.

The road relevance type includes at least one of a direct relevance, an indirect relevance, or an irrelevance, and the detailed description of the road relevance type can be found in the relevant descriptions of FIG. 2.

In some embodiments, a relevance determination model 420 refers to a model configured to determine the road relevance type and the traffic correlation. In some embodiments, the relevance determination model 420 may be a machine learning model. For example, the relevance determination model 420 may be one of Neural Networks (NN), Convolutional Neural Networks (CNN), or the like, or any combination thereof.

In some embodiments, as illustrated in FIG. 4, an input to the relevance determination model 420 may include at least one of a durability change feature 411, traffic vibration data 412, or road traffic data 413, and an output of the relevance determination model 420 may include a traffic correlation 431 and a road relevance type 432.

In some embodiments, the gas company management platform may train an initial relevance determination model based on a plurality of second training samples with second labels using a gradient descent manner, etc., to obtain the relevance determination model. A training process for the relevance determination model is similar to a training process for the feature recognition model, as detailed in the relevant descriptions in FIG. 3.

In some embodiments, the second training sample may include a sample durability change feature, sample traffic vibration data, and sample road traffic data. The second label corresponding to the second training sample may include a road relevance type and a traffic correlation corresponding to the second training sample. In some embodiments, the second training sample may be obtained based on historical data, and the second label may be determined by human annotation.

In some embodiments, the relevance determination model may include a relevance probability determination layer and a relevance type determination layer.

The relevance probability determination layer refers to a model used to determine a road relevance probability. In some embodiments, the relevance probability determination layer model may be a machine learning model. For example, the relevance probability determination layer model may be one of Neural Networks (NN), Convolutional Neural Networks (CNN), or the like, or any combination thereof.

In some embodiments, an input to the relevance probability determination layer may include at least one of the durability change feature, the traffic vibration data, or the road traffic data, and an output of the relevance probability determination layer may be the road relevance probability.

The road relevance probability is a probability that a road traffic condition is relevant to a pipeline corridor anomaly. In some embodiments, the road relevance probability may be represented in a variety of ways, such as a number, a rank, or the like.

The relevance type determination layer may be used to determine the road relevance type and the traffic correlation. In some embodiments, the relevance type determination layer model may be a machine learning model. For example, the relevance type determination layer model may be one of Neural Networks (NN), Convolutional Neural Networks (CNN), or the like, or any combination thereof. The descriptions of the road relevance type and the traffic correlation can be found in the detailed description of FIG. 2.

In some embodiments, the output of the relevance probability determination layer may be used as an input to the relevance type determination layer. The input to the relevance type determination layer may include the road relevance probability, and an output of the relevance type determination layer may include the traffic correlation and the road relevance type.

The relevance probability determination layer and the relevance type determination layer may be obtained by joint training.

In some embodiments, sample data of the joint training includes third training samples with third labels. Each set of the third training samples includes the sample durability change features, the sample traffic vibration data, and the sample road traffic data. The third labels are an actual labeled sample road relevance type and sample traffic correlation corresponding to each set of the third training samples. The third training samples may be obtained based on historical data, and the third labels may be determined by manual labeling or automatic labeling. The joint training may include inputting the sample durability change features, the sample traffic vibration data, and the sample road traffic data into the relevance probability determination layer, a sample road relevance probability outputted by the relevance probability determination layer is obtained. Inputting the sample road relevance probability as a training sample into the relevance type determination layer, the road relevance type and the traffic correlation outputted by the relevance type determination layer may be obtained. A loss function is constructed based on a sum of the sample road relevance type, the sample traffic correlation, the road relevance type and the traffic correlation outputted by the relevance type determination layer, and parameters of the relevance probability determination layer and the relevance type determination layer are synchronously updated. A trained relevance probability determination layer and a trained relevance type determination layer are obtained by updating parameters.

Based on at least one of the durability change feature, the traffic vibration data, or the road traffic data, determining the traffic correlation using the relevance determination model can further determine a relevance degree between a road traffic situation and the pipeline corridor anomaly, thereby greatly improving the accuracy of judging a traffic correlation. Determining the road relevance type (a direct relevance, an indirect relevance, and an irrelevance) based on the output of the relevance determination model can avoid the misjudgment of the subsequent determination of a traffic-affected pipeline corridor, which is conducive to improving the accuracy of a determined traffic-affected pipeline corridor.

Some embodiments of the present disclosure further provide a computer-readable storage medium, the storage medium storing computer instructions, and when a computer reads the computer instructions in the storage medium, the computer executes a method for safety monitoring of durability of a gas pipeline corridor based on a monitoring Internet of Things system.

The basic concepts have been described above, and it is apparent to those skilled in the art that the foregoing detailed disclosure is intended as an example only and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Furthermore, unless expressly stated in the claims, the order of the processing elements and sequences described herein, the use of numerical letters, or the use of other names are not intended to qualify the order of the processes and methods of the present disclosure. While some embodiments of the invention that are currently considered useful are discussed in the foregoing disclosure by way of various examples, it should be appreciated that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for safety monitoring of durability of a gas pipeline corridor based on a monitoring Internet of Things system (IoT), wherein the method is executed by a gas company management platform of a system for the safety monitoring of durability of the gas pipeline corridor based on the monitoring Internet of Things system (IoT), comprising:

obtaining durability monitoring data and traffic vibration data of the gas pipeline corridor through a gas company sensor network platform, and obtaining road traffic data through a government safety monitoring management platform via a government safety monitoring sensor network platform;

determining a traffic correlation based on at least one of the durability monitoring data, the traffic vibration data, or the road traffic data, the traffic correlation reflecting a correlation degree between a pipeline corridor anomaly and road traffic in a preset area; and determining a traffic-affected pipeline corridor based on at least one of the traffic vibration data or the traffic correlation, and reporting the traffic-affected pipeline corridor to a government safety monitoring service platform via the government safety monitoring sensor network platform and the government safety monitoring management platform, and determining whether to carry out traffic control via the government safety monitoring service platform, the traffic-affected pipeline corridor being a gas underground pipeline corridor affected by the road traffic;

the determining the traffic correlation based on the at least one of the durability monitoring data, the traffic vibration data, or the road traffic data includes:

determining a durability change feature of the gas pipeline corridor based on the durability monitoring data; and determining the traffic correlation and a road relevance type based on at least one of the durability change feature, the traffic vibration data, or the road traffic data using a relevance determination model, the road relevance type including at least one of a direct relevance, an indirect relevance, or an irrelevance, and the relevance determination model being a first machine learning model; and the determining the traffic-affected pipeline corridor based on the at least one of the traffic vibration data or the traffic correlation includes:

determining a key monitoring pipeline corridor based on the traffic vibration data; and determining the traffic-affected pipeline corridor based on the key monitoring pipeline corridor and the traffic correlation.

2. The method of claim 1, wherein determining the durability change feature of the gas pipeline corridor based on the durability monitoring data comprises:

constructing a pipeline corridor structure map; and determining the durability change feature based on the pipeline corridor structure map using a feature recognition model, the feature recognition model being a second machine learning model.

3. A system for safety monitoring of durability of a gas pipeline corridor based on a monitoring Internet of Things system (IoT), wherein the system includes a citizen user platform, a government safety monitoring service platform, a government safety monitoring management platform, a government safety monitoring sensor network platform, a government monitoring object platform, a gas company sensor network platform, and a gas device object platform;

the government monitoring object platform includes a gas company management platform, and the gas company management platform is configured to:

obtain durability monitoring data and traffic vibration data of the gas pipeline corridor through the gas company sensor network platform, and obtain road traffic data through the government safety monitoring management platform via the government safety monitoring sensor network platform;

determine a traffic correlation based on at least one of the durability monitoring data, the traffic vibration data, or the road traffic data, the traffic correlation reflecting a correlation degree between a pipeline corridor anomaly and road traffic in a preset area; and determine a traffic-affected pipeline corridor based on at least one of the traffic vibration data or the traffic correlation, and report the traffic-affected pipeline corridor to the government safety monitoring service platform via the government safety monitoring sensor network platform and the government safety monitoring management platform, and determine whether to carry out traffic control via the government safety monitoring service platform, the traffic-affected pipeline corridor being a gas underground pipeline corridor affected by the road traffic;

wherein determining the traffic correlation based on the at least one of the durability monitoring data, the traffic vibration data, or the road traffic data includes:

determining a durability change feature of the gas pipeline corridor based on the durability monitoring data; and determining the traffic correlation and a road relevance type based on at least one of the durability change feature, the traffic vibration data, or the road traffic data using a relevance determination model, the road relevance type including at least one of a direct relevance, an indirect relevance, or an irrelevance, and the relevance determination model being a first machine learning model; and wherein determining the traffic-affected pipeline corridor based on the at least one of the traffic vibration data or the traffic correlation includes:

determining a key monitoring pipeline corridor based on the traffic vibration data; and determining the traffic-affected pipeline corridor based on the key monitoring pipeline corridor and the traffic correlation.

4. The system of claim 3, wherein the gas company management platform is further configured to:

construct a pipeline corridor structure map; and determine the durability change feature based on the pipeline corridor structure map using a feature recognition model, the feature recognition model being a second machine learning model.

5. The system of claim 3, further comprising a processor, wherein the gas device object platform includes a pipeline corridor monitoring device and a ground monitoring device;

the pipeline corridor monitoring device is configured to monitor the gas pipeline corridor and upload the durability monitoring data of the gas pipeline corridor to the gas company sensor network platform;

the ground monitoring device is configured to monitor ground corresponding to the gas pipeline corridor and upload the traffic vibration data to the gas company sensor network platform; and the processor is configured to:

obtain the traffic-affected pipeline corridor from the gas company management platform and send the traffic-affected pipeline corridor to the government safety monitoring service platform; and obtain control feedback information from the government safety monitoring service platform, determine a traffic control instruction based on the control feedback information, and upload the traffic control instruction to the citizen user platform.

* * * * *